US005723780A

United States Patent [19]

Miwa et al.

[11] Patent Number: 5,723,780

[45] Date of Patent: Mar. 3, 1998

[54] FUEL SUPPLY SYSTEM FOR INTERNAL COMBUSTION ENGINE

[75] Inventors: Makoto Miwa; Naoki Yoshiume, both of Kariya, Japan

[73] Assignee: Nippondenso Co., Ltd., Kariya, Japan

[21] Appl. No.: 657,359

[22] Filed: Jun. 3, 1996

[30] Foreign Application Priority Data

Jun. 2, 1995 [JP] Japan .................................... 7-136255

[51] Int. Cl.[6] .......................... F02M 37/08; G01M 15/00

[52] U.S. Cl. ............... 73/119 A; 73/118.1; 364/431.052; 340/439

[58] Field of Search .................................. 73/119 A, 115, 73/116, 117.2, 117.3, 118.1, 49.7; 364/431.05, 431.051, 431.052, 431.053, 431.054, 431.055; 340/438, 439

[56] References Cited

U.S. PATENT DOCUMENTS

| | | | |
|---|---|---|---|
| 4,559,815 | 12/1985 | Needham | 73/119 A |
| 4,903,669 | 2/1990 | Groff et al. | 73/119 A |
| 4,977,872 | 12/1990 | Hartopp | 73/119 A |
| 5,020,362 | 6/1991 | Hart et al. | 73/119 A |
| 5,056,026 | 10/1991 | Mitchell et al. | 73/119 A |
| 5,058,547 | 10/1991 | Morikawa | 73/119 A |
| 5,237,975 | 8/1993 | Betki et al. | 123/497 |
| 5,247,444 | 9/1993 | Arai et al. | 73/119 A |
| 5,355,859 | 10/1994 | Weber | 123/497 |
| 5,386,721 | 2/1995 | Alvizar | 73/116 |
| 5,445,019 | 8/1995 | Glidewell et al. | 73/119 A |
| 5,483,940 | 1/1996 | Namba et al. | 123/497 |
| 5,492,099 | 2/1996 | Maddock | 73/119 A |
| 5,493,902 | 2/1996 | Glidewell et al. | 73/119 A |

FOREIGN PATENT DOCUMENTS

| | | |
|---|---|---|
| 3-156191 | 7/1991 | Japan . |
| 5-195894 | 8/1993 | Japan . |
| 6-147047 | 5/1994 | Japan . |

*Primary Examiner*—George M. Dombroske
*Attorney, Agent, or Firm*—Cushman Darby & Cushman IP Group of Pillsbury Madison & Sutro LLP

[57] ABSTRACT

In a fuel supply system for an internal combustion engine, a feedback correction amount relative to a reference control value for a fuel pump is derived based on a deviation between an actual fuel pressure detected by a pressure sensor and a target fuel pressure. Since the feedback correction amount is controlled to be around zero during normal operation of the system, it is checked whether the feedback correction amount is within a given range. If negative, an occurrence of abnormality in the system is determined when a residual fuel amount in a fuel tank is no less than a criterion value and further when a vehicle is not running on a rough road. When the occurrence of abnormality is determined, a failure flag is set to ON while a failure determination enabling flag is reset to OFF so as to prohibit execution of a given other failure determination process such as a misfire detection process.

13 Claims, 4 Drawing Sheets

FUEL SUPPLY SYSTEM FOR INTERNAL COMBUSTION ENGINE

BACKGROUND OF THE INVENTION

1. Field of the Invention

The present invention relates to a fuel supply system for an internal combustion engine, wherein the speed or discharge pressure of a fuel pump is feedback controlled depending on fuel pressure monitored by a fuel pressure sensor.

2. Description of the Prior Art

Returnless piping structure has been proposed for simplifying the fuel piping and lowering the fuel temperature in a fuel tank to prevent vapor formation therein. The returnless piping structure eliminates a fuel return line for returning an excessive portion of fuel, which is delivered under pressure from a fuel pump to fuel injectors (fuel injection valves), to the fuel tank. Japanese First (unexamined) Patent Publication No. 6-147047 discloses a fuel supply system employing the returnless piping structure, wherein the speed (discharge pressure) of a fuel pump is feedback controlled depending on fuel pressure detected by a fuel pressure sensor provided in the fuel piping.

In the disclosed system, however, if the fuel pressure sensor fails in operation so that a sensor output becomes lower than an actual fuel pressure, the actual fuel pressure is controlled to be higher than a target fuel pressure through the feedback control, resulting in an excess of fuel injected from the fuel injectors. On the contrary, if the sensor output becomes higher than the actual fuel pressure, the actual fuel pressure is controlled to be lower than the target fuel pressure so that a shortage of the fuel injection amount is resulted. Accordingly, the failure of the fuel pressure sensor adversely affects the fuel injection amount control (air-fuel ratio control) and deteriorates the exhaust emission, and further causes deterioration of a pressure-proof structure of the fuel piping when the actual fuel pressure is controlled to be higher than the target fuel pressure. These disadvantages may also be generated upon occurrence of abnormality in the fuel pump control system other than failure of the fuel pressure sensor.

SUMMARY OF THE INVENTION

Therefore, it is an object of the present invention to provide an improved fuel supply system for an internal combustion engine.

According to one aspect of the present invention, a fuel supply control system for an internal combustion engine comprises fuel pump control means for deriving a feedback correction amount based on a deviation between a fuel pressure in fuel piping from a fuel pump to a fuel injector and a target fuel pressure and for performing a feedback control of the fuel pump based on the feedback correction amount; and abnormality determining means for determining an occurrence of abnormality in a fuel supply system when the feedback correction value falls outside a given range.

It may be arranged that the fuel pump control means comprises reference control amount deriving means for deriving a reference control amount for the fuel pump based on a required fuel injection quantity and the target fuel pressure, and feedback amount deriving means for deriving the feedback correction amount relative to the reference control amount based on the deviation between the fuel pressure in the fuel piping and the target fuel pressure, and that the fuel pump control means stops the feedback control when the abnormality determining means determines the occurrence of abnormality, and controls the fuel pump based on the reference control amount.

It may be arranged that failure determination prohibiting means is further provided for prohibiting a given other failure determination when the abnormality determining means determines the occurrence of abnormality.

It may be arranged that the abnormality determining means prohibits determining the occurrence of abnormality when a residual fuel amount in a fuel tank is less than a given value.

It may be arranged that the abnormality determining means prohibits determining the occurrence of abnormality when a vehicle is running on a rough road.

It may be arranged that the abnormality determining means prohibits determining the occurrence of abnormality when a residual fuel amount in a fuel tank is less than a first given value and further prohibits determining the occurrence of abnormality when the residual fuel amount in the fuel tank is no less than the first given value and less than a second given value while running on a rough road.

According to another aspect of the present invention, a fuel supply system for an internal combustion engine comprises a fuel pump for supplying fuel to a fuel injector; fuel piping connecting between the fuel pump and the fuel injector; a fuel pressure sensor provided in the fuel piping for detecting a pressure of the fuel supplied to the fuel injector; fuel pump control means for deriving a feedback correction amount based on a deviation between the fuel pressure detected by the fuel pressure sensor and a target fuel pressure and for performing a feedback control of the fuel pump using the feedback correction amount; and abnormality determining means for determining an occurrence of abnormality in the fuel supply system when the feedback correction value falls outside a given range.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, preferred embodiments of the present invention will be described hereinbelow with reference to the accompanying drawings.

Figure 1:
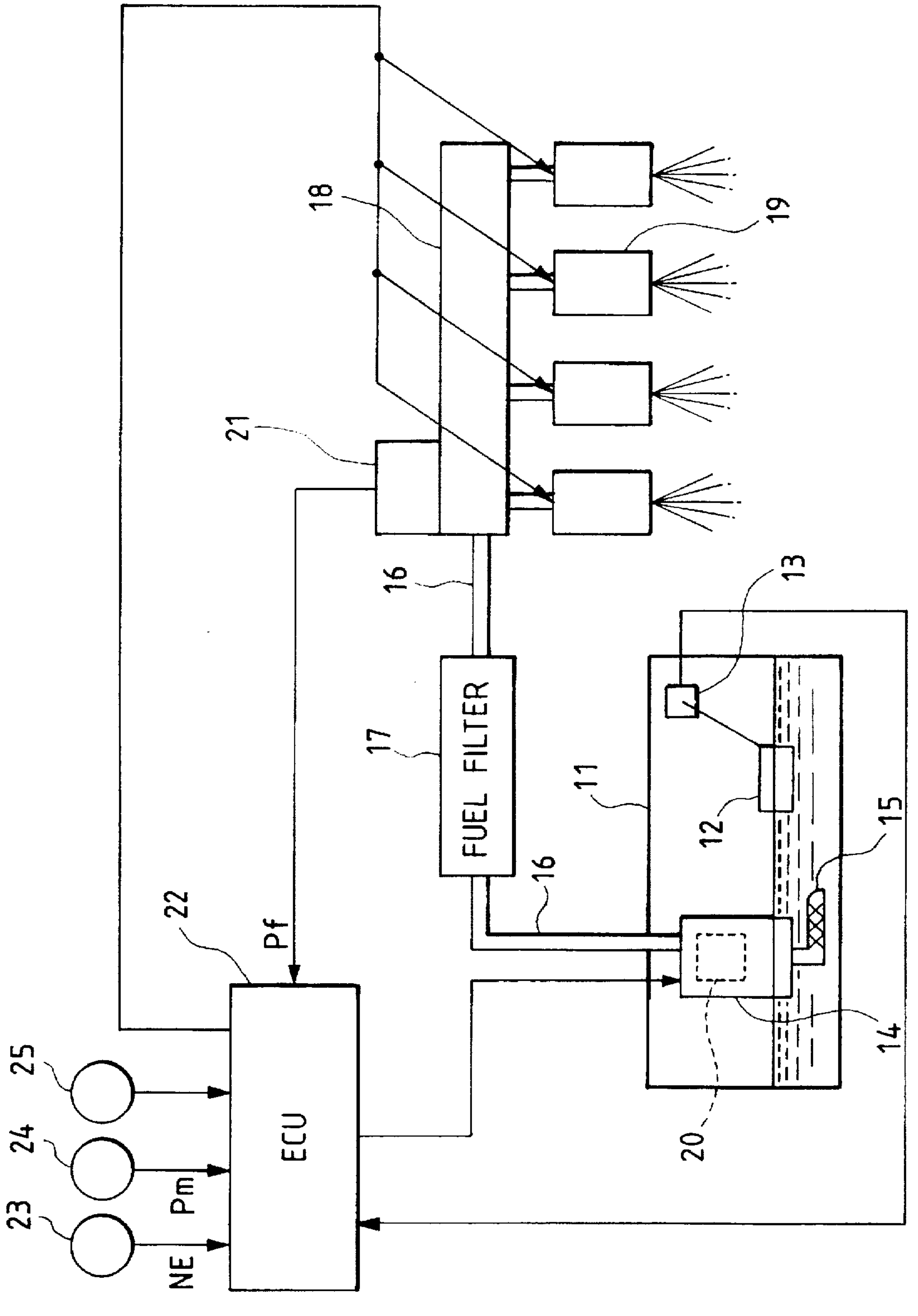
FIG. 1 is a diagram schematically showing the whole structure of a fuel supply system for an internal combustion engine according to a first preferred embodiment of the present invention.

FIG. 1 is a diagram schematically showing the whole structure of a fuel supply system for an internal combustion engine according to a first preferred embodiment of the present invention.

In the figure, a fuel level gauge 13 is provided in a fuel tank 11 for monitoring the amount of residual fuel in the fuel tank 11 using a float 12. A fuel pump 14 is further provided in the fuel tank 11 with a filter 15 arranged at an inlet side of the fuel pump 14. A fuel filter 17 is provided in a fuel line 16 connected to a discharge port of the fuel pump 14 for capturing dust in the fuel. Fuel injectors 19 are mounted on a delivery pipe 18 connected to the tip of the fuel line 16 for injecting the fuel for corresponding engine cylinders. As seen from the figure, no fuel return line is provided so that the returnless fuel piping is formed starting from the fuel tank 11 to the delivery pipe 18.

The fuel pump 14 incorporates therein adc motor 20 as a drive source. By adjusting voltage applied to the dc motor 20 through a PWM control or a DC—DC converter, the speed of the fuel pump 14 is controlled so as to control delivery or discharge pressure of the fuel pump 14. Actual pressure of the fuel discharged from the fuel pump 14 (fuel pressure Pf) is monitored by a fuel pressure sensor 21 provided in the delivery pipe 18. As appreciated, the fuel pressure sensor 21 may be provided in the fuel line 16.

Operations of the fuel pump 14 and the fuel injectors 19 are controlled by an electronic control unit (ECU) 22. The ECU 22 is mainly composed of a microcomputer having an input port to which are connected a crank angle sensor 23 outputting a pulse signal indicative of an engine speed NE, an intake manifold pressure sensor 24 outputting a signal indicative of an intake manifold pressure Pm, a vibration sensor 25 outputting a signal indicative of vertical vibration of a vehicle (that is, roughness of a road), the foregoing fuel pressure sensor 21 and fuel level gauge 13, and others.

Figure 2:
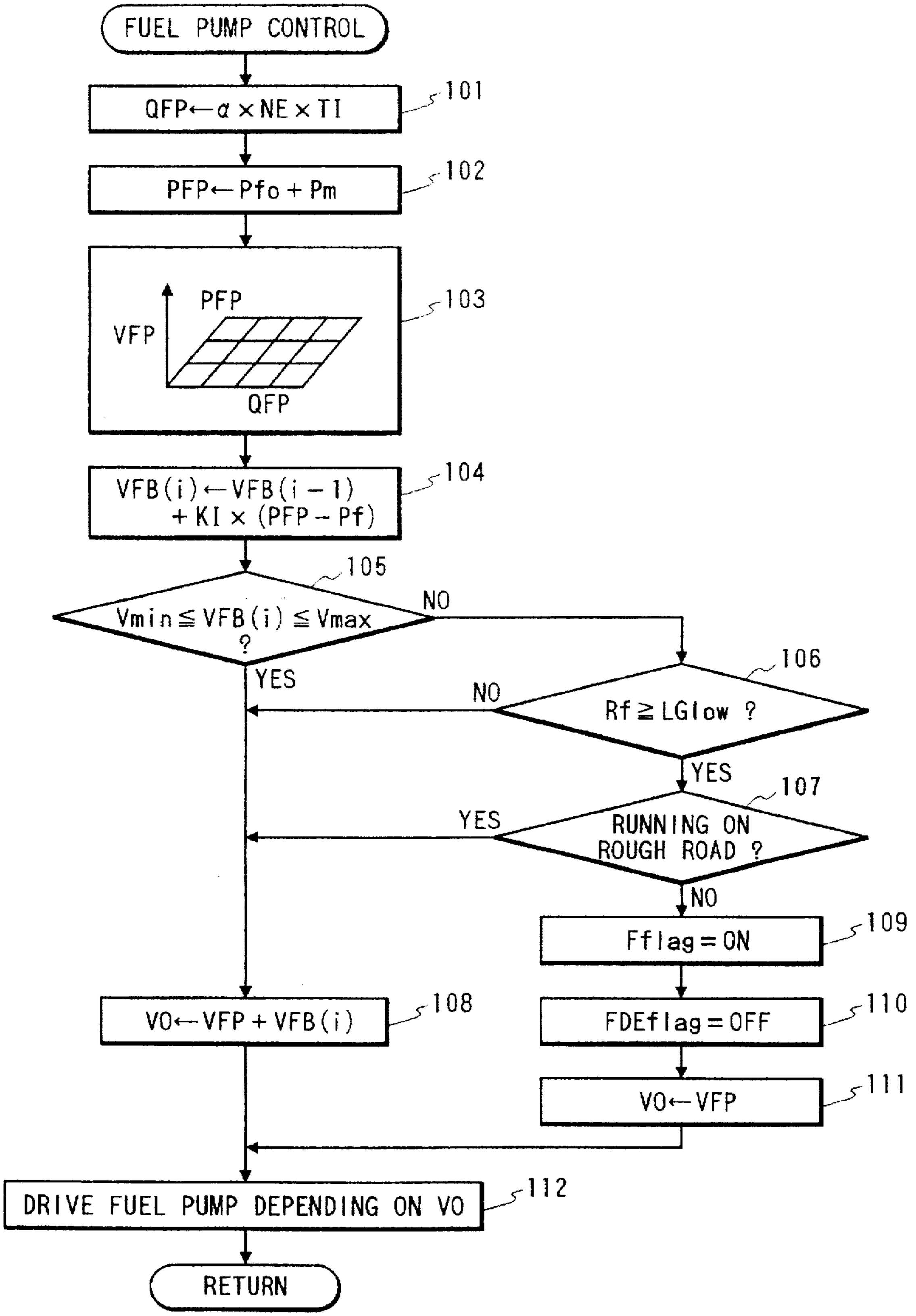
FIG. 2 is a flowchart showing a fuel pump control routine according to the first preferred embodiment.

FIG. 2 is a flowchart of a fuel pump control routine stored in a ROM (not shown) to be executed by the ECU 22 for performing a feedback control of the voltage applied to the dc motor 20 of the fuel pump 14. This control routine is repeatedly executed per given short period.

In FIG. 2, at first step 101, a fuel discharge quantity required to the fuel pump 14 (required discharge quantity QFP) is calculated from an injection pulse width TI of a signal fed to the injector 19 and an engine speed NE derived from the output signal of the crank angle sensor 23, using the following equation:

$$QFP=\alpha \times NE \times TI$$

wherein α represents a coefficient determined based on a flow rate magnitude of the injector 19, the number of the injectors 19, an injection mode and the like. Since the returnless piping structure is employed in this embodiment, the required discharge quantity QFP becomes equal to a required fuel injection quantity.

Subsequently, at step 102, a fuel discharge pressure required to the fuel pump 14 (required discharge pressure PFP) is calculated from a system target fuel pressure Pfo and an intake manifold pressure Pm, using the following equation:

$$PFP=Pfo+Pm$$

The system target fuel pressure Pfo is a fuel pressure required by the system and set as a differential pressure relative to the intake manifold pressure Pro. Pfo is normally set to a relatively low constant value in the range from 200 kPa to 350 kPa, while set to a relatively high constant value in the same range when vapor formation is liable to occur, such as at engine high temperatures, so as to suppress the vapor formation. On the other hand, since the required discharge pressure PFP required to the fuel pump 14 is derived in terms of a gauge pressure (differential pressure relative to atmospheric pressure), PFP is derived as a value which is the sum of Pfo and Pm.

In this embodiment, the intake manifold pressure Pm is derived from the output signal of the intake manifold pressure sensor 24. However, in most of the systems which directly meter the intake air quantity using for example an airflow meter, the intake manifold pressure sensor is not provided. In such systems, Pm may be estimated or projected based on engine operating conditions, that is, the engine speed and the intake air quantity.

After deriving the required discharge pressure PFP at step 102, the routine proceeds to step 103 where a reference control amount VFP for the fuel pump 14, that is, a reference value of the voltage applied to the fuel pump 14, is looked up in a two-dimensional map based on QFP and PFP derived at steps 101 and 102, respectively, and calculated through interpolation. The two-dimensional map is in the form of table data defining VFP in terms of QFP and PFP based on the performance characteristic of the fuel pump 14, and stored in the ROM of the ECU 22.

Then, at step 104, a feedback correction amount VFB relative to the reference control amount VFP is calculated based on a deviation between the required discharge pressure PFP derived at step 102 and the fuel pressure Pf monitored by the fuel pressure sensor 21, using the following equation:

$$VFB(i)=VFB(i-1)+KI \times (PFP-Pf)$$

wherein VFB(i) represents a current-cycle value of VFB, VFB(i−1) represents a last-cycle value of VFB, and KI represents an integral constant. The feedback correction amount VFB is used for compensating an excess or shortage in control amount (deviation from VFP) caused by unevenness in performance of the fuel pump 14 or aged deterioration thereof. Accordingly, if the fuel pump 14 or others in the fuel supply system operate normally, the feedback correction mount VFB (i) converges within a relatively narrow range around “0”. On the contrary, if the fuel pump 14 or others in the fuel supply system are subjected to something abnormal, the absolute value of VFB(i) becomes abnormally large.

In view of such a particular characteristic of the feedback correction mount VFB(i), step 105 checks whether $Vmin \leqq VFB(i) \leqq Vmax$, that is, whether VFB(i) is within a given range, so as to determine whether there exists abnormality in fuel pressure. If VFB(i) is within the given range at step 105, meaning that the fuel supply system works normally, the routine proceeds to step 108 where a control voltage VO for the fuel pump 14 is calculated by adding VFB(i) to the reference control amount VFP, and then to step 112 where the control voltage VO is applied to the fuel pump 14 so as to feedback control the speed (discharge pressure) of the fuel pump 14.

On the other hand, if VFB(i) is not within the given range at step 105, the routine proceeds to step 106 as determining it is possible that something abnormal is occurring in the fuel pump 14 or others in the fuel supply system. The given range, that is, Vmin and Vmax at step 105, are determined in consideration of unevenness in performance of the fuel pump 14, aged deterioration of the fuel pump 14, fluctuation in signal level of the fuel sensor 21, noise and the like.

At step 106, it is checked, using a residual fuel amount Rf in the fuel tank 11 as monitored by the fuel level gauge 13, whether the abnormality in fuel pressure is actually generated, that is, whether something abnormal is actually caused in the fuel pump 14 or others in the fuel supply system. Specifically, if only a small amount of the fuel remains in the fuel tank 11 with essentially no fuel at the inlet or suction port of the fuel pump 14, the fuel pump 14 sucks air rather then fuel so that the given fuel discharge quantity and pressure can not be achieved. In this state, even if the fuel pump 14 or others in the fuel supply system operate normally, the absolute value of the feedback correction amount VFB(i) increases to fall outside the given range. In view of this, step 106 determines whether the residual fuel amount Rf in the fuel tank 11 is no less than LGlow. LGlow represents a residual fuel amount where it is possible that the fuel pump 14 sucks the air, and is prestored in the ROM of the ECU 22. If Rf<LGlow, meaning that the fuel pump 14 may suck the air, an occurrence of fuel pressure abnormality is not determined in this case so that the routine proceeds to step 108 and then step 112 to execute the normal feedback control of the fuel pump 14.

On the other hand, if Rf≧LGlow at step 106, the routine proceeds to step 107 where it is determined whether the vehicle is running on a bad or rough road, based on the output from the vibration sensor 25 monitoring the vertical vibration of the vehicle. Specifically, while running on the rough road, even if the residual fuel amount Rf in the fuel tank 11 is no less than LGlow, since the fuel in the fuel tank 11 is largely jolted, it is possible that the fuel pump 14 sucks the air. Accordingly, if running on the rough road is determined at step 107, an occurrence of fuel pressure abnormality is not determined as in case of Rf<LGlow at step 106 so that the routine proceeds to step 108 and then step 112 to execute the normal feedback control of the fuel pump 14. Determination as to whether the vehicle is running on the rough road may be achieved by monitoring vertical vibration of the float 12 of the fuel level gauge 13, instead of using the vibration sensor 25.

As appreciated from the foregoing, only when the three conditions, that is, (1) VFB(i) is outside the given rage at step 105, (2) Rf≧LGlow at step 106, (3) vehicle is not running on the rough road at step 107, are satisfied, an occurrence of fuel pressure abnormality is determined so that the routine proceeds to step 109 and subsequent steps to execute a fail-safe process.

Specifically, at step 109, a failure flag Fflag indicative of an occurrence of fuel pressure abnormality is set to "1" (Fflag=ON). The value "1" of the failure flag Fflag is stored in a nonvolatile memory (not shown) of the ECU 22 so that the occurrence of fuel pressure abnormality can be known by reading out the value of the failure flag Fflag from the exterior using for example a checking or diagnostic tool.

Subsequently, the routine proceeds to step 110 where a failure determination enabling flag FDEflag is reset to "0" (FDEflag=OFF). Specifically, if another failure determination process is executed during occurrence of the fuel pressure abnormality (Fflag=ON), a misjudgment may be resulted. In view of this, the failure determination enabling flag FDEflag is reset at step 110 so as to prohibit the execution of another failure determination process. Subsequently, the routine proceeds to step 111 where the feedback correction amount VFB(i) is set to "0" so that the control voltage VO for the fuel pump 14 is set to the reference control amount VFP (VO←VFP). Then, at step 112, the control voltage VO (=VFP) is applied to the fuel pump 14 so that a backup control is executed upon occurrence of the fuel pressure abnormality. Since the fuel pump 14 is controlled using only the reliable control data (reference control amount) upon occurrence of the fuel pressure abnormality, deterioration of the control characteristic can be suppressed.

The foregoing other failure determination process may include, for example, a misfire detection process or a fuel system failure detection process, execution of which is prohibited by the process at step 110.

In the misfire detection process, the engine speed variation is normally monitored, and when the variation increases to a given extent, an occurrence of misfire is determined. As appreciated, when the fuel pressure is not normal, since a proper fuel injection quantity can not be attained, the misfire may be caused. Accordingly, if the misfire detection process is executed at the time of the fuel pressure being abnormal, the misfire caused by the fuel pressure abnormality may also be detected. Thus, the misfire detection is prohibited at step 110 upon occurrence of the fuel pressure abnormality so as to avoid the misjudgment.

On the other hand, in the fuel system failure detection process, an occurrence of failure is determined when, in general, a fuel feedback correction amount or a fuel learning amount exceeds a given range. When the fuel pressure is not normal, a proper fuel injection amount can not be attained so that the feedback control of the fuel pump 14 works to return the fuel injection amount to a proper value. As a result, the fuel feedback correction mount increases to a greater extent than expected so that failure in fuel system is misjudged. Thus, the fuel system failure detection is prohibited at step 110 upon occurrence of the fuel pressure abnormality so as to avoid the misjudgment.

Figure 3:
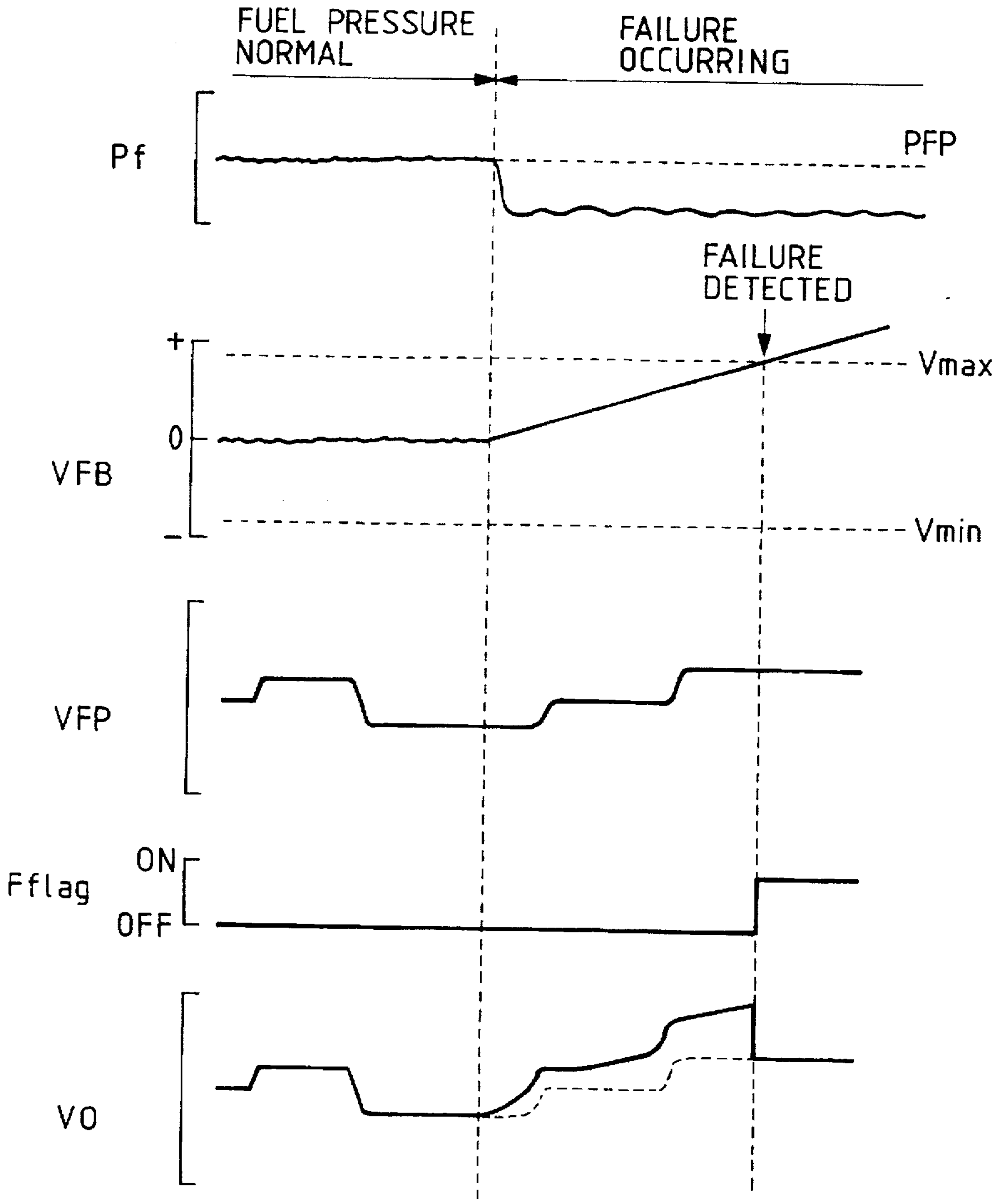
FIG. 3 is a time chart showing an operational example of a feedback control achieved by the fuel pump control routine shown in FIG. 2.

Now, an operational example of the feedback control of the fuel pump 14 achieved by the fuel pump control routine shown in FIG. 2 will be explained with reference to a time chart shown in FIG. 3.

While the fuel pressure control through the feedback control of the fuel pump 14 is performed normally, the fuel pressure Pf detected by the fuel pressure sensor 21 is substantially equal to the required discharge pressure PFP (target fuel pressure), and the feedback correction amount VFB is controlled to be around "0". Thereafter, when the failure occurs in the fuel pump 14 or others in the fuel supply system to rapidly lower the fuel pressure Pf, the feedback correction becomes effective toward increasing the pressure fuel Pf so that the feedback correction amount VFB increases gradually. When the feedback correction amount VFB exceeds Vmax representing the maximum value for failure judgment, an occurrence of failure is determined so that the failure flag Fflag is set to ON. Simultaneously, the control voltage VO for the fuel pump 14 is set to the reference control amount VFP so that the backup control for the fuel pressure abnormality is performed.

Figure 4:
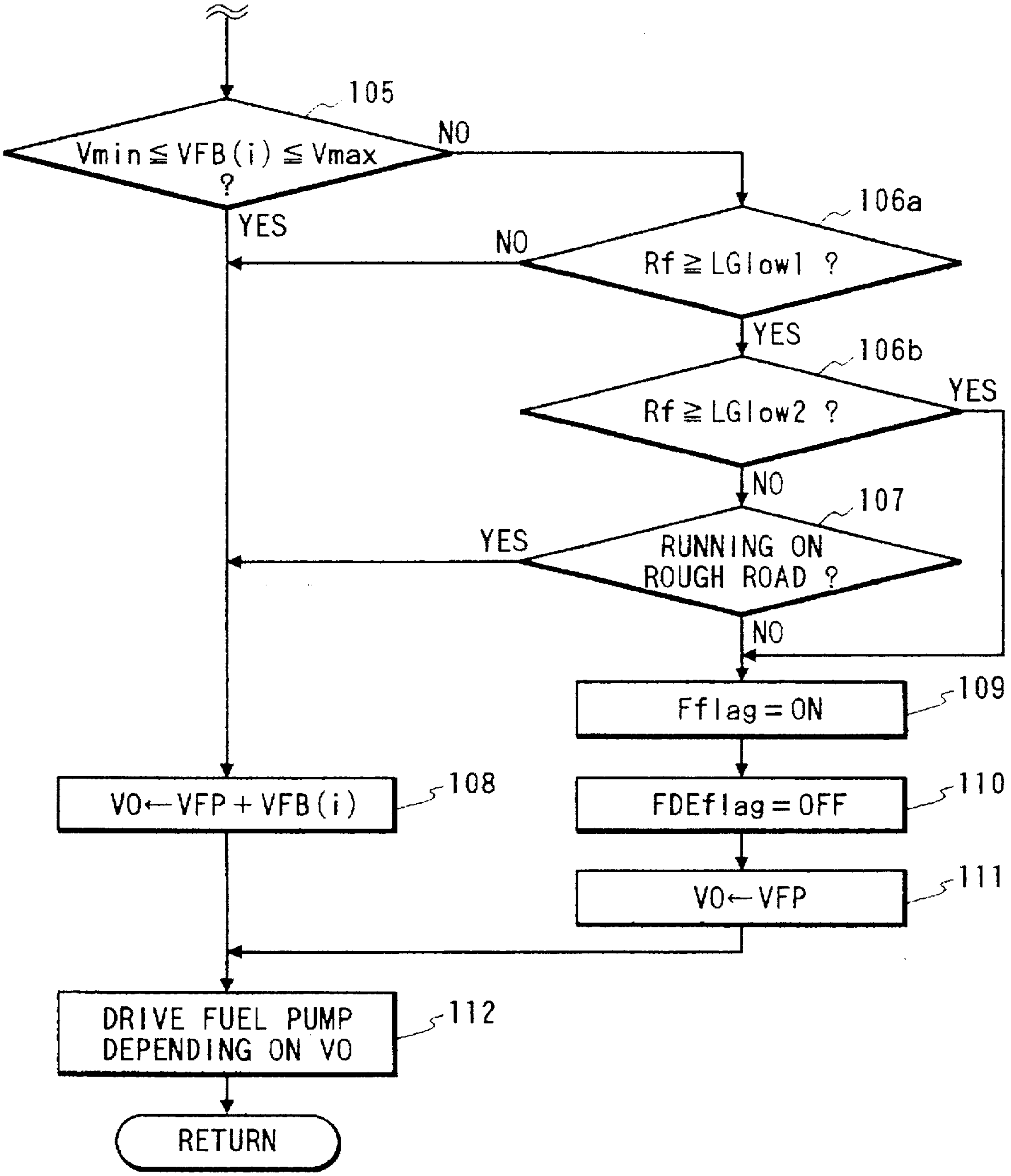
FIG. 4 is a flowchart showing a main portion of a fuel pump control routine according to a second preferred embodiment of the present invention.

FIG. 4 is a flowchart of a fuel pump control routine according to a second preferred embodiment of the present invention.

In the foregoing first preferred embodiment, only one criterion value LGlow is used for comparison with the residual fuel amount Rf in the fuel tank 11. On the other hand, in the second preferred embodiment shown in FIG. 4, the residual fuel amount Rf is compared with a first criterion value LGlow1 and a second criterion value LGlow2 (steps 106*a* and 106*b*). Specifically, when the residual fuel amount Rf is very small, it is possible that the fuel pump 14 sucks the air even when running on a paved good road. On the other hand, when the residual fuel amount Rf becomes a little larger, the fuel pump 14 does not suck the air on the good road, but sucks the air on the rough road. When the residual fuel amount Rf becomes further larger, the fuel pump 14 does not suck the air even on the rough road.

In view of this, in the second preferred embodiment, the first criterion value LGlow1 is set to a value where it is possible that the fuel pump 14 sucks the air even on the good road, while the second criterion value LGlow2 is set to a value where the fuel pump 14 does not suck the air even on the rough road. These first and second criterion values LGlow1 and LGlow2 are prestored in the ROM of the ECU 22. Referring to FIG. 4, if step 105 yields negative answer, that is, if the feedback correction amount VFB(i) is outside the given range, the routine proceeds to step 106*a* where the residual fuel amount Rf is compared with LGlow1. If $Rf < LGlow1$, since the fuel pump 14 may suck the air even on the good road, an occurrence of fuel pressure abnormality is not determined in this case so that the routine proceeds to step 108 and then to step 112 where the normal feedback control is performed. On the other hand, if $Rf \geq LGlow1$ at step 106*a*, the routine proceeds to step 106*b* where the residual fuel amount Rf is compared with LGlow2. If $Rf \geq LGlow2$, since the fuel pump 14 may not suck the air even on the rough road, an occurrence of fuel pressure abnormality is immediately determined without executing step 107 for determination as to whether running on the rough road. Thus, the routine proceeds to step 109 and subsequent steps for executing the fail-safe process.

On the other hand, if $LGlow1 \leq Rf < LGlow2$ at step 106*b*, the routine proceeds to step 107 where it is checked whether the vehicle is running on the rough road. If running on the rough road, an occurrence of fuel pressure abnormality is not determined as in case of $Rf < LGlow1$ so that the routine proceeds to step 108 and then to step 112 to execute the normal feedback control. On the other hand, if $LGlow1 \leq Rf < LGlow2$ at step 106*b* and not running on the rough road at step 107, an occurrence of fuel pressure abnormality is determined as in case of $Rf \geq LGlow2$ so that the routine proceeds to step 109 and subsequent steps for executing the fail-safe process. With this arrangement, the failure can be detected with higher accuracy depending on the residual fuel amount and the road condition, and thus, the foregoing misjudgment on the other failure detection can be prevented further reliably.

In the foregoing preferred embodiments, the fuel pressure Pf is detected in terms of a gauge pressure (differential pressure relative to atmospheric pressure) using the fuel pressure sensor 21. On the other hand, it may be arranged to derive a differential pressure between the fuel pressure Pf and the intake manifold pressure Pm using a pressure sensor.

While the present invention has been described in terms of the preferred embodiments, the invention is not to be limited thereto, but can be embodied in various ways without departing from the principle of the invention as defined in the appended claims.

What is claimed is:

1. A fuel supply control system for an internal combustion engine, comprising:

fuel pump control means for deriving a feedback correction amount based on a deviation between a fuel pressure in fuel piping from a fuel pump to a fuel injector and a target fuel pressure, and for performing a feedback control of said fuel pump based on said feedback correction amount; and abnormality detecting means for detecting an occurrence of abnormality in a fuel supply system when said feedback correction amount falls outside a given range.

2. The fuel supply control system according to claim 1, wherein said fuel pump control means comprises reference control amount deriving means for deriving a reference control amount for said fuel pump based on a required fuel injection quantity and said target fuel pressure, and feedback mount deriving means for deriving the feedback correction amount relative to said reference control amount based on the deviation between the fuel pressure in said fuel piping and said target fuel pressure, and wherein said fuel pump control means stops said feedback control when said abnormality detecting means detects the occurrence of abnormality, and controls said fuel pump based on said reference control amount.

3. The fuel supply control system according to claim 1, further comprising failure determination prohibiting means for prohibiting a given other failure determination when said abnormality detecting means detects the occurrence of abnormality.

4. The fuel supply control system according to claim 1, wherein said abnormality detecting means prohibits detecting the occurrence of abnormality when a residual fuel amount in a fuel tank is less than a given value.

5. The fuel supply control system according to claim 1, wherein said abnormality detecting means prohibits detecting the occurrence of abnormality when a vehicle is running on a rough road.

6. A fuel supply control system for an internal combustion engine, comprising:

fuel pump control means for deriving a feedback correction amount based on a deviation between a fuel pressure in fuel piping from a fuel pump to a fuel injector and a target fuel pressure, and for performing a feedback control of said fuel pump based on said feedback correction amount; and abnormality detecting means for detecting an occurrence of abnormality in a fuel supply system when said feedback correction amount falls outside a given range, wherein said abnormality detecting means prohibits detecting the occurrence of abnormality when a residual fuel amount in a fuel tank is less than a first given value and further prohibits detecting the occurrence of abnormality when the residual fuel amount in the fuel tank is no less than said first given value and less than a second given value while running on a rough road.

7. A fuel supply system for an internal combustion engine, comprising:

a fuel pump for supplying fuel to a fuel injector;

fuel piping connecting between said fuel pump and said fuel injector;

a fuel pressure sensor provided in said fuel piping for detecting a pressure of the fuel supplied to said fuel injector;

fuel pump control means for deriving a feedback correction mount based on a deviation between the fuel pressure detected by said fuel pressure sensor and a target fuel pressure and for performing a feedback control of said fuel pump using said feedback correction mount; and abnormality detecting means for detecting an occurrence of abnormality in the fuel supply system when said feedback correction value falls outside a given range.

8. A fuel supply control system for an internal combustion engine, comprising:

fuel pump controller for deriving a feedback correction amount based on a deviation between a fuel pressure in fuel piping from a fuel pump to a fuel injector and a target fuel pressure, and for performing a feedback control of said fuel pump based on said feedback correction amount; and abnormality detector for detecting an occurrence of abnormality in a fuel supply system when said feedback correction amount falls outside a given range.

9. The fuel supply control system according to claim 8, wherein said fuel pump controller comprises a first device for deriving a reference control amount for said fuel pump based on a required fuel injection quantity and said target fuel pressure, and a second device for deriving the feedback correction amount relative to said reference control amount based on the deviation between the fuel pressure in said fuel piping and said target fuel pressure, and wherein said fuel pump controller stops said feedback control when said abnormality detector detects the occurrence of abnormality, and controls said fuel pump based on said reference control amount.

10. The fuel supply control system according to claim 8, further comprising a device for prohibiting a given other failure determination when said abnormality detector detects the occurrence of abnormality.

11. The fuel supply control system according to claim 8, wherein said abnormality detector prohibits detecting the occurrence of abnormality when a residual fuel amount in a fuel tank is less than a given value.

12. The fuel supply control system according to claim 8, wherein said abnormality detector prohibits detecting occurrence of an abnormality when a vehicle is running on a rough road.

13. A fuel supply control system for an internal combustion engine, comprising:

fuel pump controller for deriving a feedback correction amount based on a deviation between a fuel pressure in fuel piping from a fuel pump to a fuel injector and a target fuel pressure and for performing a feedback control of said fuel pump based on said feedback correction amount; and abnormality detector for detecting an occurrence of abnormality in a fuel supply system when said feedback correction amount falls outside a given range, wherein aid abnormality detector prohibits detecting the occurrence of abnormality when a residual fuel amount in a fuel tank is less than a first given value and further prohibits detecting the occurrence of abnormality when the residual fuel amount in the fuel tank is no less than said first given value and less than a second given value while running on a rough road.

* * * * *